United States Patent
Shin et al.

(10) Patent No.: US 9,256,100 B2
(45) Date of Patent: Feb. 9, 2016

(54) TRANSFLECTIVE LIQUID CRYSTAL DISPLAY DEVICE

(71) Applicant: LG Display Co., Ltd., Seoul (KR)

(72) Inventors: Seung-Hwan Shin, Jeollabuk-Do (KR); Ju-Han Kim, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/673,434

(22) Filed: Mar. 30, 2015

(65) Prior Publication Data

US 2015/0205163 A1   Jul. 23, 2015

Related U.S. Application Data

(62) Division of application No. 12/961,183, filed on Dec. 6, 2010, now abandoned.

(30) Foreign Application Priority Data

Dec. 11, 2009 (KR) .................. 10-2009-0123515

(51) Int. Cl.
G02F 1/1335    (2006.01)
G02F 1/1343    (2006.01)
G02F 1/1362    (2006.01)
G02F 1/1368    (2006.01)

(52) U.S. Cl.
CPC ........ *G02F 1/133555* (2013.01); *G02F 1/1368* (2013.01); *G02F 1/133528* (2013.01); *G02F 1/133602* (2013.01); *G02F 1/134363* (2013.01); *G02F 1/136209* (2013.01); *G02F 2001/133531* (2013.01); *G02F 2001/136222* (2013.01)

(58) Field of Classification Search
CPC .................................................. G02F 1/133555
See application file for complete search history.

(56) References Cited

U.S. PATENT DOCUMENTS

| 6,940,480 B2 * | 9/2005 | Lu ................................... 345/92 |
| 6,999,147 B2 | 2/2006 | Maeda |
| 8,558,770 B2 * | 10/2013 | Matsushima et al. ........... 345/87 |
| 2005/0140862 A1 * | 6/2005 | Jang et al. ..................... 349/113 |
| 2005/0231666 A1 * | 10/2005 | Kim et al. ..................... 349/114 |
| 2009/0273748 A1 | 11/2009 | Jeong |

FOREIGN PATENT DOCUMENTS

| CN | 1424617 A | 6/2003 |
| CN | 1790139 A | 6/2006 |
| KR | 10-2009-0114641 A | 11/2009 |

* cited by examiner

*Primary Examiner* — Timothy L Rude (74) *Attorney, Agent, or Firm* — Birch, Stewart, Kolasch & Birch, LLP (57) ABSTRACT

A transflective liquid crystal display device including, according to one embodiment, a liquid crystal display panel including first and second substrates, a plurality of gate lines and data lines on the first substrate defining a plurality of pixel regions, a thin film transistor at each pixel region, a black matrix and a color filter layer on the second substrate, and a liquid crystal layer between the first an second substrates; a first polarizer and a second polarizer; a backlight unit; a selective reflection film between the liquid crystal display panel and the second polarizer; and a first reflecting layer on at least one of the gate line and the data line of the liquid crystal display panel. The black matrix and the color filter layer include opened areas corresponding to the first reflecting layer so that the light reflected from the first reflecting layer is transmitted through the black matrix and the color filter layer through the opened portions.

10 Claims, 7 Drawing Sheets

TRANSFLECTIVE LIQUID CRYSTAL DISPLAY DEVICE

CROSS-REFERENCE TO RELATED APPLICATIONS

This application is a Divisional of co-pending U.S. application Ser. No. 12/961,183 filed on Dec. 6, 2010, which claims priority under 35 U.S.C. §119(a) to Korean Application No. 10-2009-0123515 filed on Dec. 11, 2009. The entire contents of all of the above applications are hereby incorporated by reference.

BACKGROUND OF THE INVENTION

1. Field of the Invention

The present invention relates to a transflective liquid crystal display device, and more particularly, a transflective liquid crystal display device capable of implementing an entire pixel region both in a reflection mode and in a transmission mode by reflecting external light (ray) incident on a lower side of a liquid crystal display panel and transmitting light incident from a backlight unit.

2. Discussion of Background Art

In general, a liquid crystal display (LCD) device is a display device using characteristics of liquid crystal molecules which are aligned in different manners depending on a voltage applied. The LCD device can be driven with lower power than cathode-ray tube (CRT), and very advantageous for reducing size and thickness, thereby being concentrated as a flat panel display (FPD) device for computer monitors, TVs or the like, for example. In addition, the LCD device is light and thin so as to be easily portable, thereby being widely used for display devices of laptop computers, personal digital assistants (PDAs) and the like.

The LCD device is a device which includes two substrates each having an electrode and disposed to urge the two electrode face each other and a liquid crystal (LC) layer interposed between the two substrates, so as to control movement of liquid crystal molecules by use of an electric field generated by a difference of voltages applied to the two electrodes and adjust light transmittance accordingly, thereby realizing an image.

Meanwhile, the LCD device is generally a passive device which cannot emit light by itself, so it needs an independent light source. Therefore, in addition to a liquid crystal (LC) panel configured with the two substrates and the LC layer, a backlight for supplying light to a rear surface of the LC panel is disposed to urge light emitted from the backlight incident on the LC panel. Accordingly, the incident light can be adjusted according to the arrangement of liquid crystal, thereby displaying an image.

This type of LCD device is referred to as a transmission type LCD device. The transmission type LCD device uses an artificial light source, such as the backlight, so it can display a bright image even in a dark external environment. However, the backlight should be supplied with power. Accordingly, when the transmission type LCD device is used for a display device of a portable apparatus, it causes a relatively high power consumption.

Therefore, to make up for the drawbacks, a reflection type LCD device using an external light source without use of the backlight has been proposed. The reflection type LCD device operates using external natural light or artificial light so as to remarkably reduce the power consumption of the backlight. Consequently, it consumes relatively less power than the transmission type LCD device, which allows a long-time use, thereby being usually employed in portable devices, such as PDAs.

The reflection type LCD device does not include an independent light source, accordingly, it has an advantage in view of the low power consumption but also has a disadvantage in view of impossible use in a place without external light.

Hence, a transflective type LCD device which employs only the advantages of the reflection type LCD device and the transmission type LCD device has recently been introduced.

Figure 1:
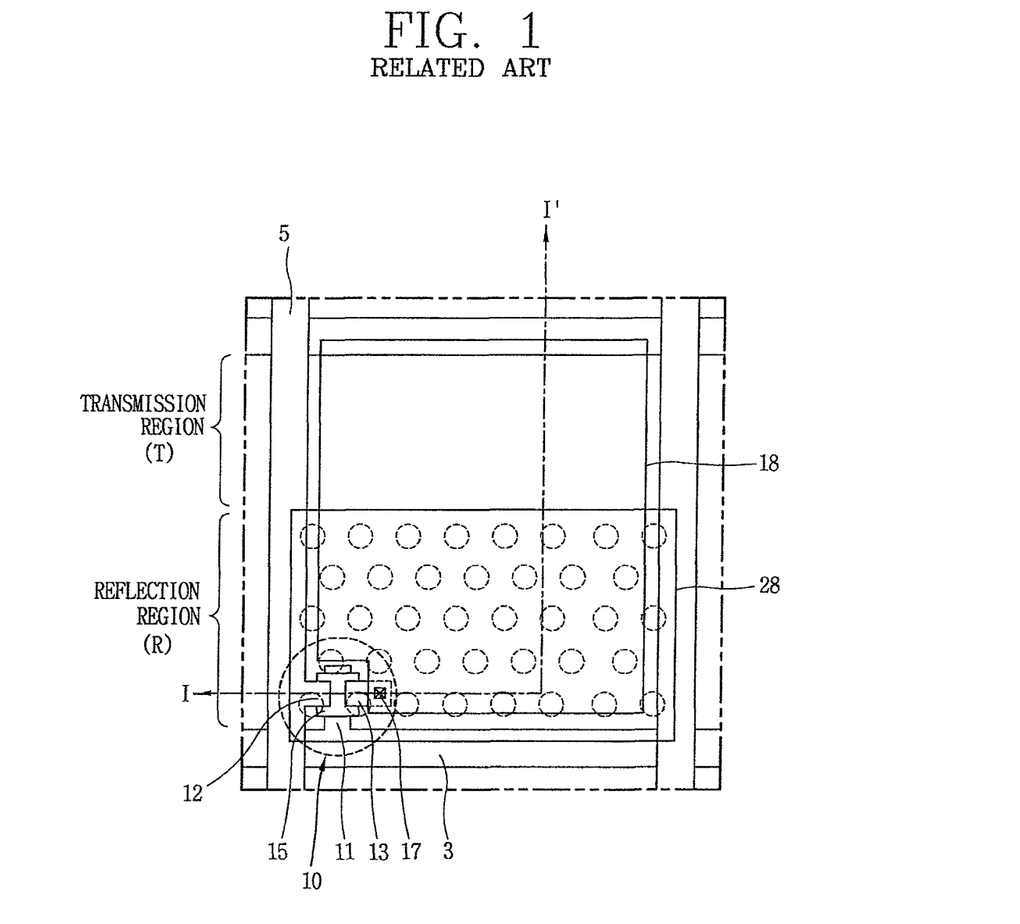
FIG. 1 is a planar view showing a structure of a transflective LCD device according to the related art.
Figure 2:
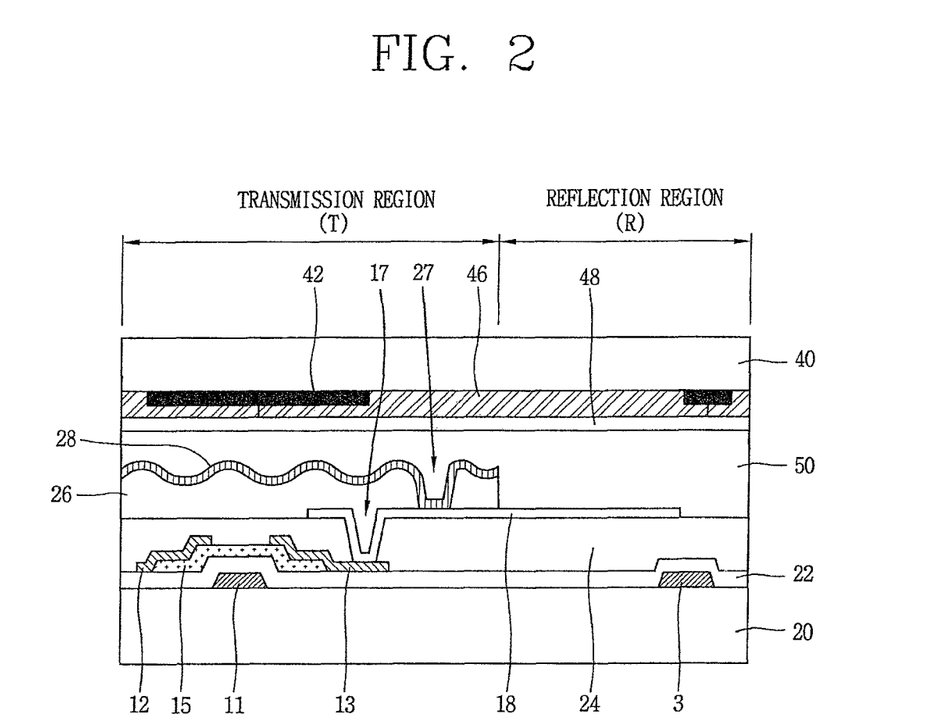
FIG. 2 is a sectional view taken along the line I-I of FIG. 1.

FIG. 1 is a planar view showing part of a display region of an LC panel in a transflective type LCD device according to the related art, and FIG. 2 is a sectional view taken along the line I-I of FIG. 1, which shows one pixel region.

As shown in FIG. 1, in each of N×N pixel regions vertically and horizontally arranged on the LCD device 1 is provided a thin film transistor (TFT) 10 located at an intersection between a gate line 3 for receiving a scan signal from an external driving circuit and a data line for receiving an image signal therefrom. The TFT 10 includes a gate electrode 11 connected to the gate line 3, a semiconductor layer 15 formed on the gate electrode 11 and activated when the scan signal is applied to the gate electrode 11, and a source electrode 12 and a drain electrode 13 both formed on the semiconductor layer 15. There is also provided in each pixel region a pixel electrode 18, which is connected to the source and drain electrodes 12 and 13 for receiving an image signal via the source and drain electrodes 12 and 13 in response to the activation of the semiconductor layer 15 so as to drive liquid crystal molecules (not shown).

The pixel region includes a transmission region T for transmitting light incident from a lower backlight (not shown), and a reflection region R for reflecting light incident from the exterior, and a reflecting layer 28 is provided in the reflection region R for reflecting light which is incident from the outside.

As shown in FIG. 2, the gate electrode 11 of the TFT and the gate line 3 are formed on the first substrate 20, and a gate insulating layer 22 is deposited on the entire first substrate 20. The semiconductor layer 15 is formed on the gate insulating layer 22 and the source and drain electrodes 12 and 13 are placed on the semiconductor layer 15, thereby configuring the TFT. Although not shown, the data line 5 is formed on the gate insulating layer 22.

Referring to FIG. 2, a passivation layer 24 is printed on the entire first substrate 20, and the pixel electrode 18 made of a transparent electrode, such as indium tim oxide (ITO), is formed on the passivation layer 24. As shown in the drawing, a contact hole 17 is formed at the passivation layer 24 for allowing an electrical connection between the drain electrode 15 of the TFT and the pixel electrode 18.

An insulating layer 26 is formed on the passivation layer 24 located on the transmission region T, and the reflecting layer 28 is formed on the insulating layer 26. Here, the insulating layer 26 has a contact hole 27 for allowing an electrical connection between the reflecting layer 28 and the pixel electrode 18.

The second substrate 40 includes a black matrix 42 and a color filter layer 46. The black matrix 42 is configured to prevent light leakage into a region (i.e., image non-display region) in which liquid crystal molecules are not driven. As shown, the black matrix 42 is mostly formed on the TFT region and between pixels (i.e., gate line and data line regions). The color filter layer 46 is configured with red (R), blue (B) and green (G) sub color filters so as to represent actual colors. The first substrate 20 and the second substrate 40 are bonded in an aligned state and a liquid crystal layer 50 is formed between the first and second substrates 20 and 40, thereby fabricating the LCD device 1.

Although not shown, a polarizer is disposed at an outer side of the LCD device 1 so as to polarize light incident on and output from the LCD device 1.

However, in the transflective LCD device with the structure, one pixel is divided into a reflection part and a transmission part, so, upon being driven in a reflection mode or a transmission mode, each pixel is substantially used by about 50%. Accordingly, an aperture ratio is drastically lowered upon operation in the reflection mode and the transmission mode, finally causing degradation of luminance, resulting in lowering an image display quality.

SUMMARY OF THE INVENTION

Therefore, to overcome those problems, an object of the present invention is to provide a transflective LCD device capable of implementing an entire pixel region not only in a reflection mode but also in a transmission mode by reflecting external light incident on a lower side of a LC panel and transmitting light incident from a backlight.

Another object of the present invention is to provide a transflective LCD device capable of further improving luminance by forming a reflecting layer on an electrode within a LC panel so as to reflect incident light from the outside.

To achieve these and other advantages and in accordance with the purpose of the present invention, as embodied and broadly described herein, there is provided a transflective liquid crystal display device including, a liquid crystal display panel including first and second substrates, a plurality of gate lines and data lines on the first substrate defining a plurality of pixel regions, a thin film transistor at each pixel region, a black matrix and a color filter layer on the second substrate, and a liquid crystal layer between the first an second substrates; a first polarizer and a second polarizer above and below the liquid crystal display panel, respectively; a backlight unit below the second polarizer to supply light to the liquid crystal display panel; a selective reflection film between the liquid crystal display panel and the second polarizer to reflect light incident from the exterior and transmit light emitted from the backlight unit; and a first reflecting layer on at least one of the gate line and the data line of the liquid crystal display panel to reflect light input from the exterior.

The first polarizer and the second polarizer may have optical axes perpendicular to each other.

The second polarizer and the selective reflection film may have optical axes horizontal to each other.

The selective reflection film may include a first base film and a second base film, and a polarizing unit disposed between the first and second base films to transmit a first polarized light and reflect a second polarized light among incident light.

In the present invention, each pixel region can be implemented both in a reflection mode and in a transmission mode by urging light incident from the exterior reflected and light incident from the backlight unit transmitted, thereby improving luminance of the liquid crystal display device.

Also, in the present invention, a reflecting layer can be formed on an electrode within the liquid crystal display panel so as to allow reflection of light incident from the exterior, thereby further improving the luminance of the liquid crystal display device.

Further, the driving method of the transflective liquid crystal display device in accordance with the present invention comprises providing the transflective liquid crystal display device including the transflective liquid crystal display device including, a liquid crystal display panel including first and second substrates, a plurality of gate lines and data lines on the first substrate defining a plurality of pixel regions, a thin film transistor at each pixel region, a first reflecting layer on at least one of the gate line and the data line to reflect incident light from the exterior, a black matrix and a color filter layer on the second substrate, and a liquid crystal layer between the first an second substrates, a first polarizer and a second polarizer above and below the liquid crystal display panel, respectively, a backlight unit below the second polarizer to supply light to the liquid crystal display panel, and, a selective reflection film between the liquid crystal display panel and the second polarizer to reflect light incident from the exterior and transmit light emitted from the backlight unit; turning off the back light to driving the transflective liquid crystal display device in the reflection mode; turning of the liquid crystal display panel, the un-polarized light incident from the outside being polarized into the first polarized light by the first polarizer, the optical axis of the first polarized light being parallel to that of the first polarizer, the first polarized light passing the turned-off liquid crystal layer without the retardation and reflecting by the selective reflection film to re-pass the liquid crystal layer without the retardation, thereby the first polarized light is passing the first polarizer to display white mode; turning on the liquid crystal display panel, the first polarized light polarized by the first polarizer passing the turn-on liquid crystal layer with the retardation and being polarized into the second polarized light, the optical axis of the second polarized light being parallel to that of the second polarizer, the second polarized light passing the selective reflection film and the second polarizer to display black mode; turning on the back light to driving the transflective liquid crystal display device in the transmission mode; turning off the liquid crystal display panel, the light from the back light being polarized into a second polarized light by the second polarizer, the optical axis of the second polarized light being parallel to that of the second polarizer, the second polarized light passing the selective reflection film and the turned off liquid crystal display panel without retardation, thereby the second polarized light is absorbed by the first polarizer to display black mode; and turning on the liquid crystal display panel, the second polarized light polarized by the second polarizer being passing the selective reflection film and the second polarized light being polarized into a first polarized light by passing the turned on liquid crystal display panel with retardation, thereby the first polarized light is passing the first polarizer to display white mode, the optical axis of the first polarized light being parallel to that of the first polarizer.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, description will be given of the present invention in detail with reference to the accompanying drawings.

Figure 3:
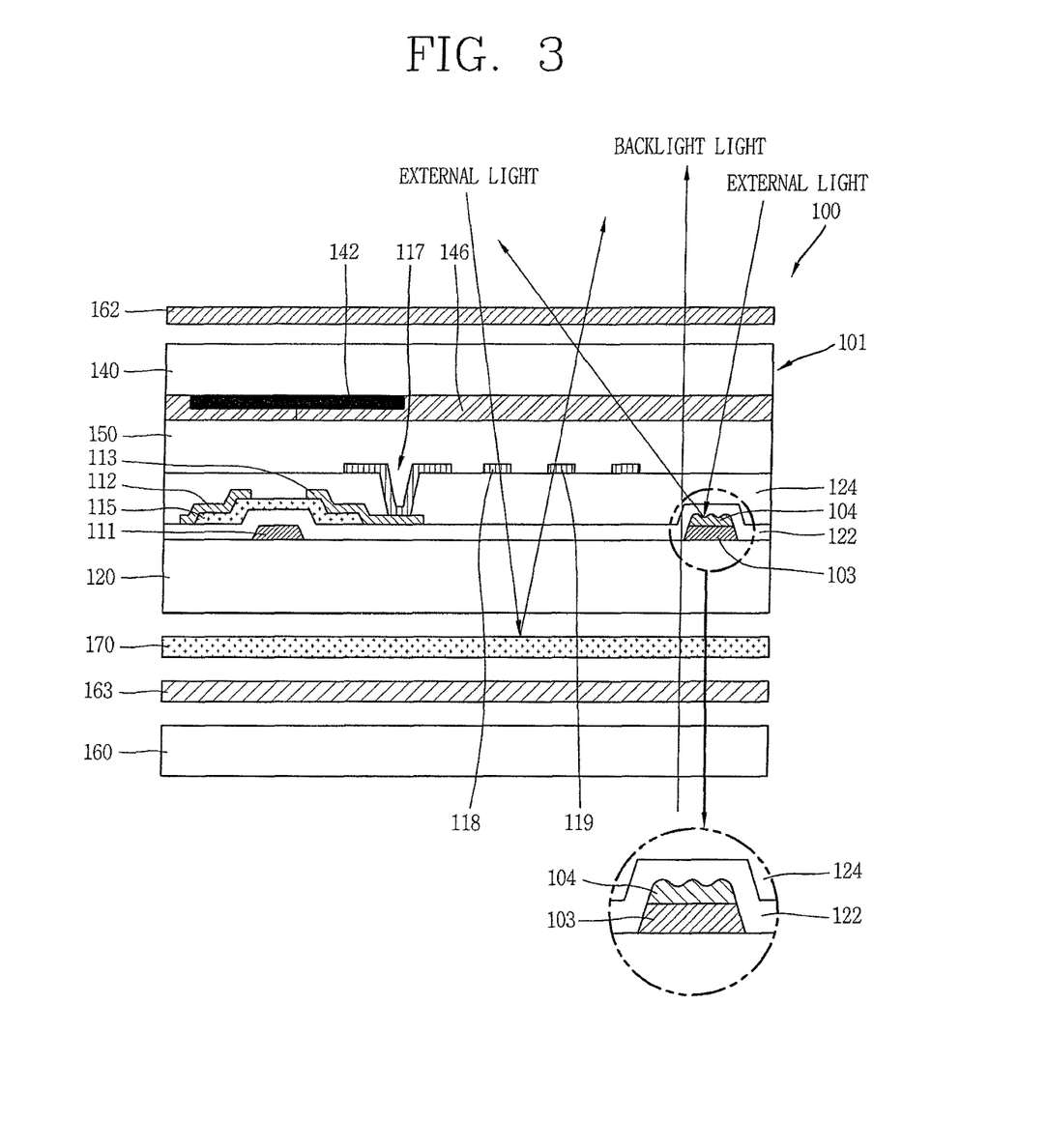
FIG. 3 is a sectional view showing a structure of a transflective LCD device in accordance with a first embodiment of the present invention.

FIG. 3 is a sectional view showing a structure of a transflective LCD device in accordance with a first embodiment of the present invention.

As shown in FIG. 3, an LCD device 100 according to the present invention may include a liquid crystal (LC) panel 101 for implementing actual images, a first polarizer 162 and a second polarizer 163 disposed above and below the LC panel 101, respectively, for polarizing light incident on the LC panel 101 and light transmitted through the LC panel 101, respectively, a selective reflection film 170 located between the LC panel 101 and the second polarizer 163 for transmitting light incident through the second polarizer 163 and reflecting light incident through the LC panel 101, and a backlight unit 160 for supplying light to the LC panel 101.

The LC panel 101 may include a first substrate 120, a second substrate 140, and a liquid crystal (LC) layer 150 interposed between the first and second substrates 120 and 140.

The first substrate 120 is a TFT array substrate on which TFTs are formed. Each TFT may include a gate electrode 111 formed on the first substrate 120, a gate insulating layer 122 printed all over the first substrate 20 having the gate electrode 111 thereon, a semiconductor layer 115 formed on the gate insulating layer 112, and a source electrode 112 and a drain electrode 113 both formed on the semiconductor layer 115.

The first substrate 120 may further include a gate line 103. Although not shown, a data line is formed on the gate insulating layer 122. Substantially, a plurality of gate lines 103 and data lines are arranged horizontally and vertically to define a plurality of pixel regions, accordingly, the TFT is formed at the intersection between the gate line 103 and the data line within each pixel region.

The first substrate 120 having the TFT thereon is provided with a passivation layer 124, and a common electrode 118 and a pixel electrode 119 are formed on the passivation layer 124. Here, the common electrode 118 and the pixel electrode 119 are aligned substantially in parallel to the data line within the pixel region, thus creating a parallel field between the common electrode 118 and the pixel electrode 119 to be substantially in parallel to the surface of the first substrate 120. The pixel electrode 119 may be electrically connected to the drain electrode 113 of the TFT via a contact hole 117 formed at the passivation layer 124 such that a data signal applied via an external driving device via the data line can be applied to the pixel electrode 119 via the source and drain electrodes 112 and 113.

A reflecting layer 104 may be formed on the gate line 103. The reflecting layer 104 may be made of a metal with good reflectance, such as Al or Al alloy, and reflect incident light from the outside. Here, a surface of the reflecting layer 104 may be waved or embossed, accordingly when driving the LC panel 101 in a reflection mode, the reflecting layer 104 disperses light, which is incident from the exterior above the LC panel and then reflected, thereby urging uniform light supplied to the LC panel 101.

In the drawing, the reflecting layer 104 is formed only on the gate line 103. Alternatively, the reflecting layer 104 may be formed on the data line.

The second substrate 140 may include a black matrix 142 and a color filter layer 146. The black matrix 142 is configured to prevent light leakage into a region (image non-display region) in which liquid crystal molecules are not driven, and formed at the TFT region as shown in the drawing. That is, in the present invention, the black matrix 142 is formed only at the TFT region, not on the gate line 103. As such, by virtue of the structure in which the black matrix 142 is not formed at a region of the second substrate 140 corresponding to the gate line 103, when light incident from the outside above the LC panel 101 is reflected by the reflecting layer 104 disposed on the gate line 103, such light is blocked by the black matrix 142, thereby preventing luminance from being lowered.

Since the light emitted to the upside of the gate line 103 is blocked by the reflecting layer 104 in the transmission mode, the image quality degradation due to the light leakage in the transmission mode may not occur.

In the meantime, the black matrix 142 is not formed only at the region corresponding to the upper surface of the gate line 103; however, the black matrix 142 may not be formed even at the region corresponding to the upper surface of the data line.

The color filter layer 146 may be provided with red (R), blue (B) and green (G) sub color filters so as to realize actual colors. The first substrate 120 and the second substrate 140 are bonded in an aligned state and a liquid crystal (LC) layer 150 interposes between the first and second substrates 120 and 140, thereby fabricating the LC panel 101.

The LC panel 101 in the above structure is an in plane switching (IPS) mode LC panel configured such that the common electrode 118 and the pixel electrode 119 are formed on the first substrate 120 and apply a field, substantially in parallel to the surface of the first substrate 120, to the LC layer 150 so as to make liquid crystal molecules switched on a surface parallel to the first substrate 120. However, the present invention may not be limited to the IPS LC panel, but applicable to a twisted nematic (TN) mode LC panel in which a common electrode and a pixel electrode are formed on first and second substrates, respectively, so as to form an electric field, perpendicular to the first substrate, on a LC layer, or a vertical alignment (VA) mode LC panel for perpendicularly aligning liquid crystal molecules.

The selective reflection film 170 may be an optical film configured to transmit light polarized to a specific direction and selectively reflect light polarized to a different direction. Such selective reflection film 170 is shown in FIG. 4.

Figure 4:
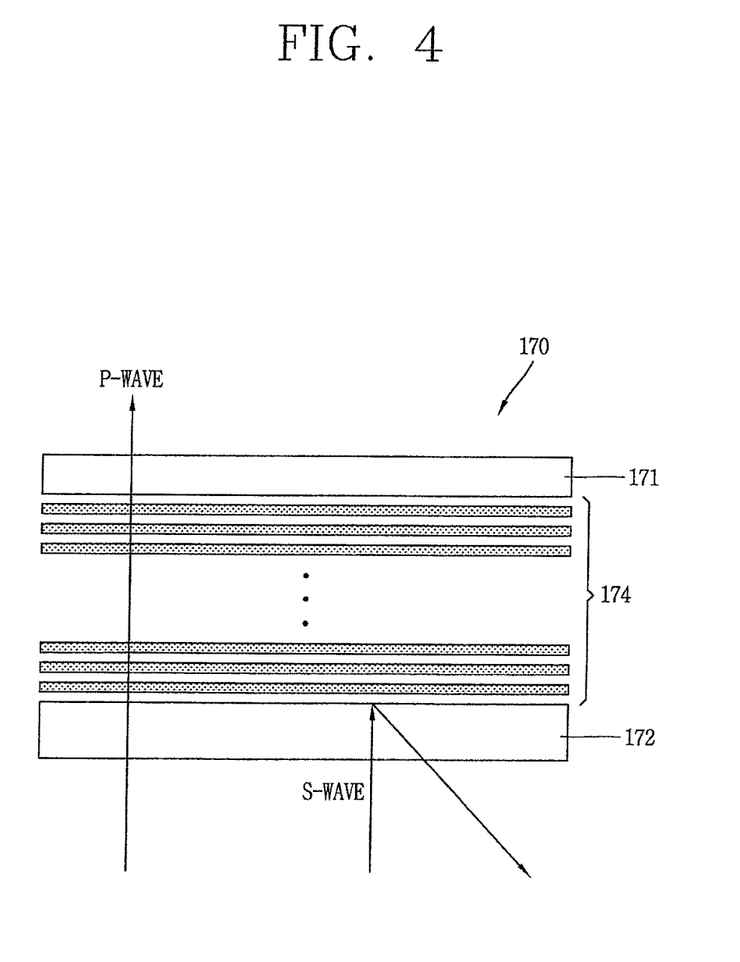
FIG. 4 is a sectional view showing a structure of a selective reflection film according to the present invention.

As shown in FIG. 4, the selective reflection film 170 may include a first base film 171, a second base film 172, and a polarizing unit 174 disposed between the first and second base films 171 and 172 and made of several hundred sheets of isotropic media and anisotropic media with high double refraction characteristic so as to transmit P-wave components and reflect S-wave components of incident light.

The first and second base films 171 and 172 are transparent films, which may be made of poly ester (PET), polymethylmethacrylate (PMMA), poly carbonate (PC) or the like.

Referring to FIG. 4, the selective reflection film 170 is allowed for selective reflection because P-wave is transmitted and S-wave is reflected among incident light from the outside.

The backlight unit 160 may emit light to supply to the LC panel 101. Although not shown, the backlight unit 160 may include a plurality of light sources for emitting light. As a light source, fluorescent lamps, such as cold cathode fluorescent lamps (CCFLs) or external electrode fluorescent lamps (EEFLs), and a plurality of light emitting diodes (LEDs) may be used. Upon use of the LEDs, LEDs which emit red, green and blue monochromatic rays may be used, or white LEDs which emit white rays may be used.

The light source may be disposed in plurality below the LC panel 101 to supply light directly to the LC panel 101, or be disposed at a side below the LC panel 101 to supply light to the LC panel 101. When the light source is disposed at the side below the LC panel 101, a light guide plate is disposed below the LC panel 101 and the light source is placed at the side of the light guide plate such that light incident onto the side surface of the light guide plate is guided to the light guide plate and thereafter supplied to the LC panel 101.

Also, an optical sheet for improving efficiency of light emitted from the light source may be disposed at the backlight unit 160, and an absorption plate for absorbing incident light may be provided at a lower region thereof.

The first polarizer 162 and the second polarizer 163 disposed above and blow the LC panel, respectively, have optical axes perpendicular to each other, and the optical axis of the second polarizer 163 is in parallel to an optical axis of the selective reflection film 170.

The LCD device in the aforesaid structure is the transflective LCD device. That is, when light is incident from the exterior above the LC panel 101 in the reflection mode, the incident light is reflected by the selective reflection film 170 to be supplied to the LC panel 101, thereby realizing an image. On the other hand, in the transmission mode, light emitted from the backlight unit 160 is transmitted through the selective reflection film 170 to be supplied to the LC panel 101, thereby realizing an image.

Hereinafter, operations of the transflective LCD device 100 having the structure in the reflection mode and in the transmission mode will be described in detail.

As shown in FIG. 3, when the transflective LCD device 100 according to the present invention runs in the reflection mode, the backlight unit 160 is turned off, so external light is transmitted through the first polarizer 162 to be incident on the LC panel. The incident light is then transmitted sequentially through the color filter layer 146 and the LC layer 150 so as to reach the selective reflection film 170 via the first substrate 120. Such incident external light is selectively reflected at the surface of the selective reflection film 170, accordingly, the reflected light is transmitted again through the LC panel 101 and the first polarizer 162, thereby displaying an image.

Here, the incident external light is reflected at the reflecting layer 104 formed within the LC panel 101 to be output back to the exterior via the LC layer 150. Consequently, upon forming the reflecting layer 104 on the gate line 103, the reflectance of the incident external light can be improved as compared to non-existence of the reflecting layer 104 on the gate line 103, thereby enhancing luminance in the reflection mode.

Hereinafter, description will be given of light proceeding in a reflection mode with reference to FIG. 5A which shows a light polarized state of the LCD device 100 in the reflection mode.

Figure 5A:
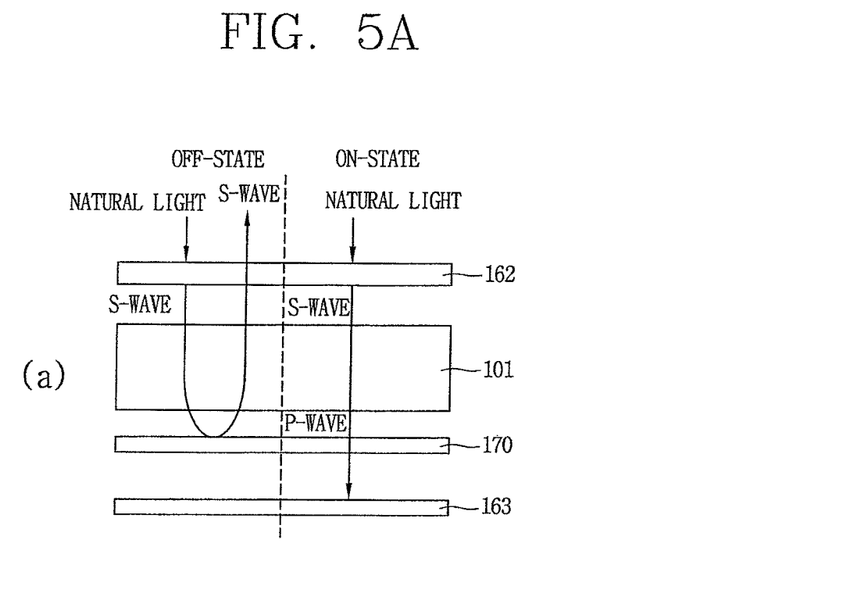
FIGS. 5A and 5B are views showing polarized states of light, respectively, in a reflection mode and in a transmission mode of the transflective LCD device according to the present invention.

As shown in FIG. 5A, in a turn-off state of the LC panel 101, every natural light in a polarized state is incident to be polarized into S-wave by the first polarizer 162. Since power is not applied to the LC layer 150, no retardation occurs in the LC layer 150, so the S-wave is transmitted through the LC layer 150 still in the polarized state. Under this state, when the S-wave transmitted through the LC layer 150 reaches the selective reflection film 170, P-wave is transmitted and the S-wave is reflected by the selective reflection 170. Accordingly, the reached S-wave is reflected by the selective reflection film 170 so as to be supplied back to the LC layer 150. Since no retardation occurs in the LC layer 150, the S-wave supplied to the LC layer 150 is transmitted directly through the LC layer 150 and sequentially transmitted through the first polarizer 162 having an optical axis of the S-wave, thereby displaying a white color on the LCD device 100.

In the meantime, S-wave of the light reflected by the reflecting layer 104 of the LC panel 101 is reflected as it is, so it is transmitted through the LC layer 150 and the first polarizer 162, thereby displaying a white color.

In a turn-on state of the LC panel 101, every natural light in a polarized state is transmitted from the exterior through the first polarizer 162, so as to be polarized into S-wave. When the S-wave is transmitted through the LC panel 101 to which power has been applied, the S-wave passes through the LC layer 150 arranged in a specific form and accordingly the polarized state of the light is changed due to the retardation. Consequently, the S-wave is converted into P-wave.

When the light converted into P-wave reaches the selective reflection film 170, the P-wave is transmitted and S-wave is reflected by the selective reflection film 170 such that the incident P-wave is transmitted through the selective reflection film 170. Since an optical axis of the second polarizer 163 is in parallel to the optical axis of the selective reflection film 170, the light transmitted through the selection reflection film 170 is immediately transmitted through the second polarizer 163 such that the P-wave is incident into the backlight unit 160. Here, the light incident into the backlight unit 160 is absorbed by an absorption layer (not shown) disposed within or at a lower side of the backlight unit 160, thereby displaying a completely black color on the LCD device 100.

In the meantime, if the intensity of power applied to the LC panel 101 is appropriately adjusted, the arrangement of the LC layer 150 can be properly controlled, thereby controlling the retardation level. As a result, even in the turn-on state of the LC panel 101, light is allowed to be reflected by the selective reflection film 170, so as to display a gray level.

In case where the transflective LCD device 100 according to the present invention runs in the transmission mode, as shown in FIG. 3, the backlight unit 160 is turned on, light is emitted from a lamp (not shown) of the backlight unit 160 and is transmitted through the second polarizer 163.

Since the second polarizer 163 has an optical axis of P-wave, the light transmitted through the second polarizer 163 is polarized into P-wave. Since the selective reflection film 170 transmits the P-wave and reflects the S-wave, the P-wave polarized by the second polarizer 163 is transmitted through the selective reflection film 170 and then sequentially transmitted through the first substrate 120, the LC layer 150 and the first polarizer 162.

Here, the retardation of the light transmitted through the LC layer 150 is varied depending on an arranged state of liquid crystal molecules of the LC layer 150, and the light polarized state changes responsive to the retardation variation.

The light, which is transmitted through the first polarizer 162 or absorbed without transmission can be controlled according to the light polarized state, whereby a gray level in a middle gradation of several colors including white and black colors.

Hereinafter, description will be given of light proceeding in a transmission mode with reference to FIG. 5B which shows a light polarized state of the transflective LC device 100.

Figure 5B:
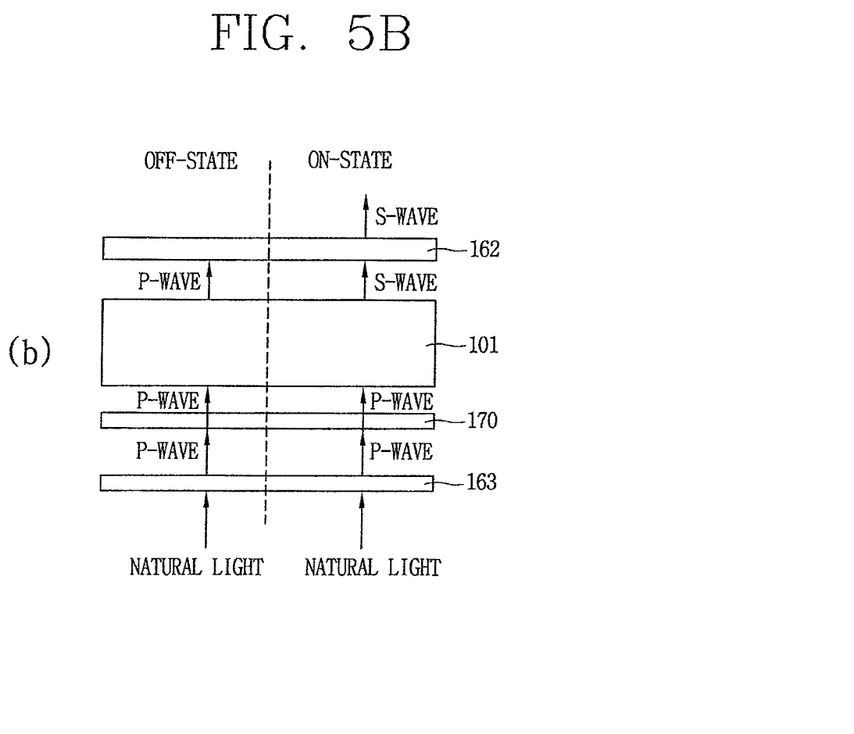

As shown in FIG. 5B, in a turn-off state of the LC panel 101, natural light incident from the backlight unit 160 is polarized into P-wave by virtue of the second polarizer 163, and thereafter the P-wave is incident onto the selective reflection film 170. Since the selective reflection film 170 transmits the P-wave and reflects S-wave, the reached P-wave is transmitted through the selective reflection film 170 to be incident onto the LC layer 150.

Since no power is applied to the LC layer 150, retardation does not occur, so the incident P-wave is transmitted through the LC layer 150 still in the polarized state. Under this state, when the P-wave transmitted through the LC layer 150 reaches the first polarizer 162, the P-wave is absorbed by the first polarizer 162, thereby displaying a black color on the LCD device 100.

In a turn-on state of the LC panel 101, light emitted from the backlight unit 160 is transmitted through the second polarizer 163 so as to be converted into P-wave, which is then transmitted immediately through the selective reflection film 170 to be supplied to the LC panel 101. When the P-wave is transmitted through the LC panel 101 to which power has been applied, the P-wave moves through the LC layer 150 arranged in a specific form, and accordingly the polarized state of the light is changed due to the retardation. Consequently, the P-wave is converted into S-wave. Also, since the first polarizer 162 has an optical axis in parallel to S-wave, the S-wave is transmitted directly through the second polarizer 162, accordingly, a white color is displayed on the LCD device 100.

In the meantime, if the intensity of power applied to the LC panel 101 is appropriately adjusted, the arrangement of the LC layer 150 can be properly controlled, thereby controlling the retardation level. As a result, even in the turn-on state of the LC panel 101, a gray level of light transmitted through the selective reflection film 170 can be displayed.

As such, in the transflective LCD device 100 according to the present invention, since one pixel region is used both as a reflection region and as a transmission region, luminance can be enhanced as compared to the related art transflective LCD device using one pixel region by dividing into the reflection region and the transmission region. The luminance enhancement may result from improvement of an aperture ratio of the transmission region within each pixel region of the first substrate 120. For the related art transflective LCD device, only 50% pixel region is used as the transmission region, so an image may be realized by light transmitted through only 50% transmission region of the pixel region. On the other hand, in the transflective LCD device 100 according to the present invention, one pixel region P is entirely used as the transmission region, so the luminance characteristic can be enhanced more than that of the transflective LCD device 1 according to the related art.

Furthermore, in the present invention, the reflecting layer 104 located on the gate line 103 can reflect light incident from the exterior onto the gate line 103 so as to be supplied back to the LC layer 150, so the luminance of the transflective LCD device 100 can further be enhanced.

Figure 6:
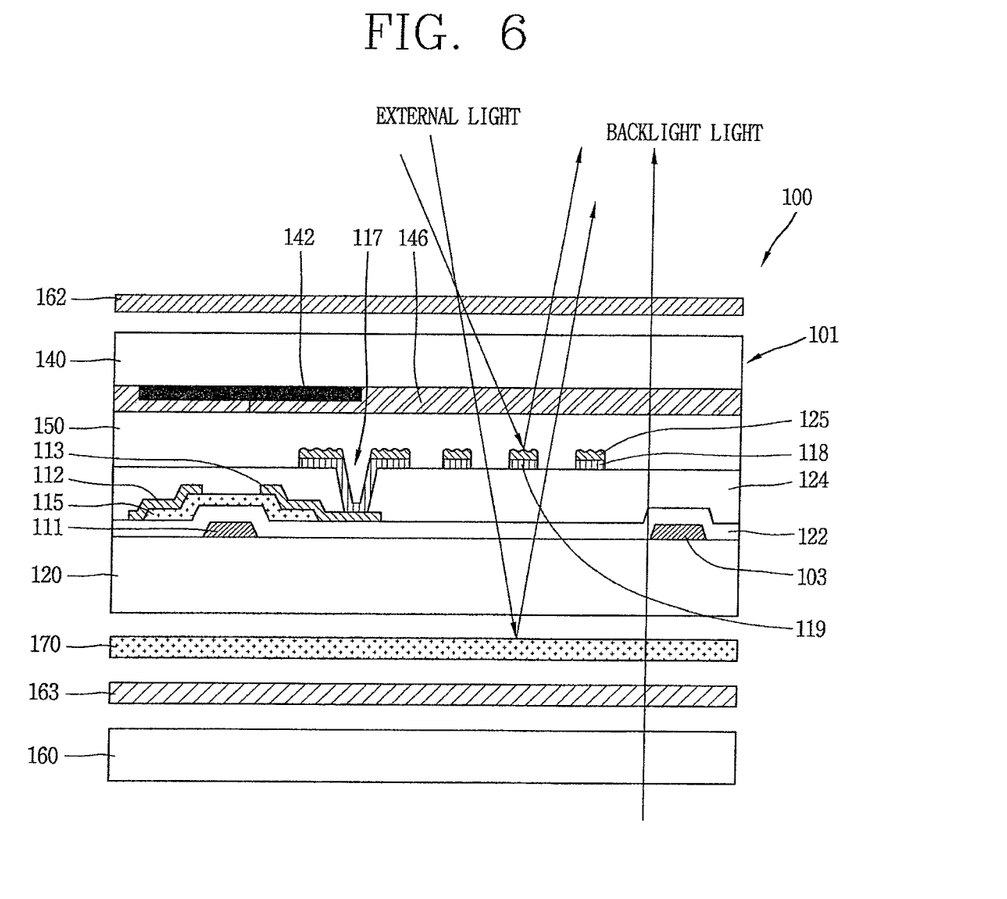
FIG. 6 is a sectional view showing a structure of a transflective LCD device in accordance with a second embodiment of the present invention.

FIG. 6 is a sectional view showing a structure of a transflective LCD device in accordance with a second embodiment of the present invention. The transflective LCD device 100 according to this embodiment has the same structure and operation manner as those of the transflective LCD device 100 of the first embodiment shown in FIG. 3, excluding a reflecting layer. Hence, description will be given only of the structure of the reflecting layer without the description of the same structure and operation manner. Also, the like/similar reference numerals are given to the same configurations as those in the first embodiment shown in FIG. 3.

As shown in FIG. 6, the transflective LCD device 200 according to the second embodiment may include a reflecting layer 125 formed on the common electrode 118 and the pixel electrode 119. Here, the reflecting layer 125 is made of a metal with high reflectance, such as Al or Al alloy. Accordingly, in the reflection mode, the reflecting layer 125 can reflect external light, which is incident onto the common electrode 118 and the pixel electrode 119, toward the LC layer 150, so as to improve luminance in the reflection mode of the transflective LCD device 200.

Here, an upper surface of the reflecting layer 125 is waved or embossed to disperse incident light, thereby allowing light with uniform luminance to be reflected to the LC layer 150.

Here, the drawing shows the configuration that the reflecting layer 125 is formed only on the common electrode 118 and the pixel electrode 119. However, the reflecting layer 125 may also be formed on the gate line 103 and the data line as well the common electrode 118 and the pixel electrode 119.

Figure 7:
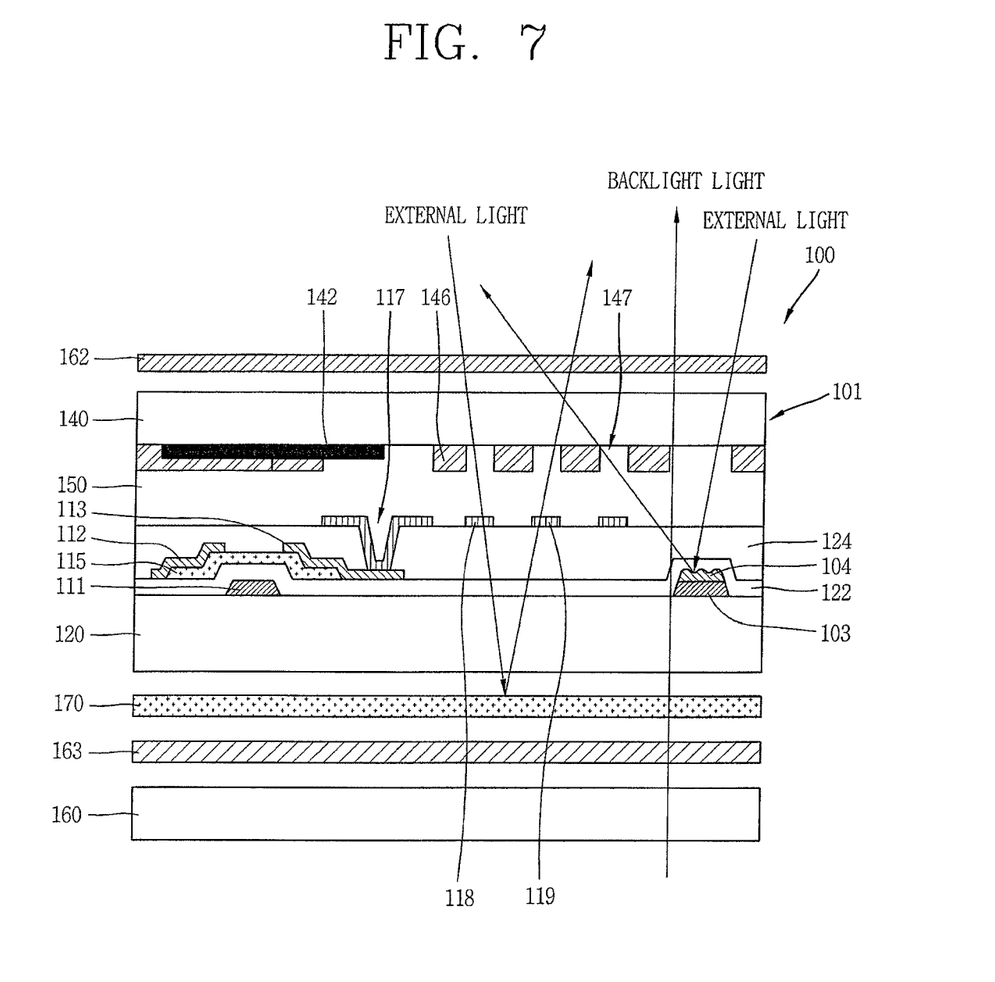
FIG. 7 is a sectional view showing a structure of a transflective LCD device in accordance with a third embodiment of the present invention.

FIG. 7 is a sectional view showing a structure of a transflective LCD device in accordance with a third embodiment of the present invention. The transflective LCD device according to the third embodiment has the same structure and operation manner as those of the transflective LCD device 100 of the first embodiment shown in FIG. 3, excluding a color filter layer 146. Hence, description will be given only of the structure of the color filter layer 146 without the description of the same structure and operation manner. Also, the like/similar reference numerals are given to the same configurations as those in the first embodiment shown in FIG. 3.

In the transflective LCD device 100 according to the third embodiment, the color filter layer 146 is partially removed to minimize light absorption by the color filter layer 146, thereby improving luminance of the transflective LCD device 100.

That is, referring to FIG. 7, the color filter layer 146 on the gate line 103, the common electrode 118 and the pixel electrode 119 is removed to form openings 147. Accordingly, light transmitted through the LC panel 101 is emitted externally without being absorbed at the openings 147, thereby improving luminance.

Here, since the openings 147 correspond to the gate line 103, the common electrode 118 and the pixel electrode 119, an image may not be realized, so a phenomenon that an image quality is lowered due to the opening 147 may not occur.

In the meantime, FIG. 7 shows that the openings 147 are formed above the gate line 103, the common electrode 118 and the pixel electrode 119. However, the openings 147 may also be formed above the data line. Alternatively, the opening 147 may be formed respectively on the gate line 103, the common electrode 118, the pixel electrode 119 and the data line.

As described above, since the present invention uses one pixel region as a reflection region as well as a transmission region, luminance can be improved as compared to the related art transflective LCD device which uses one pixel region by diving into the reflection region and the transmission region. Also, the present invention can form the reflecting layer on an electrode line of the LC panel to reflect external light incident on the electrode line, thus further improving the luminance of the LCD device.

Meanwhile, the aforesaid description is given of a transflective LCD device in a specific structure; however, the present invention may not be limited to the specific structure. Alternatively, the present invention may be applied to transflective LCD device in various structures, which can be designed by applying the basic concept of the present invention.

In other words, other embodiments or variations of the LCD device using the basic concept of the present invention may easily be derived by a person skilled in the art.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A transflective liquid crystal display device comprising:
    a liquid crystal display panel including first and second substrates, a plurality of gate lines and data lines on the first substrate defining a plurality of pixel regions, a thin film transistor at each pixel region, a black matrix and a color filter layer on the second substrate, and a liquid crystal layer between the first and second substrates;
    a first polarizer and a second polarizer above and below the liquid crystal display panel, respectively;
    a backlight unit below the second polarizer to supply light to the liquid crystal display panel;
    a selective reflection film between the liquid crystal display panel and the second polarizer to reflect light incident from the exterior and transmit light emitted from the backlight unit; and
    a first reflecting layer on at least one of the gate line and the data line of the liquid crystal display panel to reflect light input from the exterior,
    wherein the black matrix and the color filter layer include opened areas corresponding to the first reflecting layer so that the light reflected from the first reflecting layer is transmitted through the black matrix and the color filter layer through the opened portions.

2. The device of claim 1, wherein an optical axes of the first polarizer is perpendicular with the optical axes of the second polarizer.

3. The device of claim 1, wherein the optical axes of the second polarizer is parallel to the optical axes of the selective reflection film.

4. The device of claim 1, wherein the selective reflection film comprises:
    a first base film and a second base film; and
    a polarizing unit disposed the first and second base films to transmit a first polarized light and reflect a second polarized light of the incident light.

5. The device of claim 1, further comprising:
    at least one common electrode and a pixel electrode disposed in parallel to each other on the pixel region to apply a field parallel to the surface of the first substrate into the liquid crystal display panel; and
    a second reflecting layer on at least one of the common electrode and the pixel electrode so as to reflect light incident from the exterior.

6. The device of claim 5, wherein the surfaces of the first and second reflecting layers are formed in the wave shape.

7. The device of claim 5, wherein the surfaces of the first and second reflecting layers are embossed.

8. The device of claim 1, wherein the surfaces of the first and second reflecting layers are formed in the wave shape.

9. The device of claim 1, wherein the surfaces of the first and second reflecting layers are embossed.

10. A transflective liquid crystal display device comprising:
    a liquid crystal display panel including first and second substrates, a plurality of gate lines and data lines on the first substrate defining a plurality of pixel regions, a thin film transistor at each pixel region, a common electrode and a pixel electrode on each pixel region to create a field parallel to the surface of the first substrate, a black matrix and a color filter layer formed on the second substrate, and a liquid crystal layer between the first an second substrates;
    a first polarizer and a second polarizer above and below the liquid crystal display panel, respectively;
    a backlight unit below the second polarizer to supply light to the liquid crystal display panel;
    a selective reflection film between the liquid crystal display panel and the second polarizer to reflect light incident from the exterior and transmit light emitted from the backlight unit; and
    a first reflecting layer on at least one of the gate line, the data line, the common electrode and the pixel electrode of the liquid crystal display panel to reflect light input from the exterior,
    wherein the black matrix and the color filter layer include opened areas corresponding to at least one of the first reflecting layers on the gate lines, the data lines, the common electrodes and the pixel electrodes so that the light reflected from the first reflecting layer is transmitted through the black matrix and the color filter layer through the opened portions.

* * * * *